Patented Oct. 16, 1951

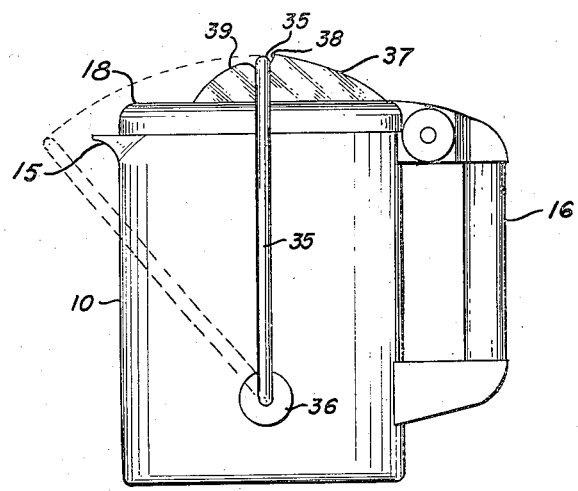
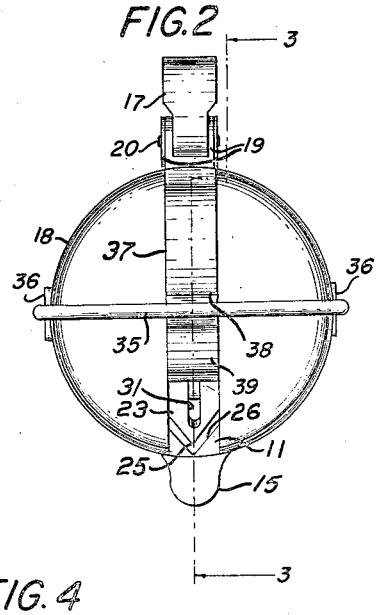
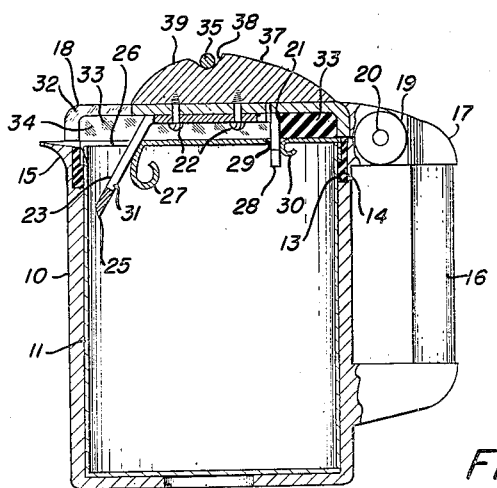
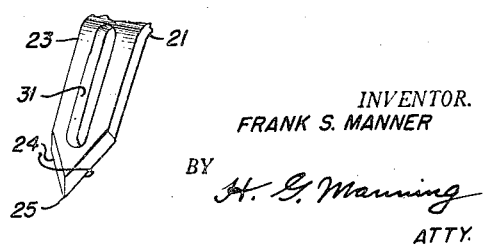

2,571,464

UNITED STATES PATENT OFFICE 2,571,464

COMBINED CAN OPENER AND PITCHER

Frank S. Manner, Waterbury, Conn.

Application June 24, 1948, Serial No. 34,919

3 Claims. (Cl. 222—83.5)

1

This invention relates to liquid dispensing receptacles, and more particularly to a combined can opener and pitcher.

One object of this invention is to provide a device of the above nature which is adapted to conceal a can therein, whereby the device will be suitable for use as a pitcher for pouring liquids such as canned milk.

Another object is to provide a device of the above nature which includes a cover having a cutting element thereon, whereby the operation of closing the cover will simultaneously cut an opening in the can contained in the receptacle.

Another object is to provide a device of the above nature, having an improved cutting element which is so formed as to facilitate the flow of liquid from the can during the pouring operation.

A further object is to provide a device of the above nature which will be simple in construction, inexpensive to manufacture, easy to manipulate, compact, ornamental in appearance, hygienic, and very efficient and durable in use.

With these and other objects in view, there has been illustrated on the accompanying drawing one form in which the invention may conveniently be embodied in practice.

In the drawing,

Fig. 1 is a side view of the combined can opener and pitcher.

Fig. 2 is a plan view of the same.

Fig. 3 is a longitudinal sectional view, taken substantially on the line 3—3 of Fig. 2.

Fig. 4 is a perspective view of one of the cutting elements.

Referring now to the drawings in which like reference numerals denote corresponding parts throughout the several views, the numeral 10 indicates a cylindrical receptacle or container which is of a suitable size and shape to receive a can 11 such as is commonly used for marketing milk and other liquid commodities. The container 10 is provided in its bottom with a central hole 12 which may be used to facilitate ejection of the can 11 therefrom when empty, and an inner annular recess 13 adjacent its upper end for receiving a cylindrical resilient packing ring 14 of rubber or other suitable material. The ring 14 is adapted to closely embrace the upper end of the can 11 so as to prevent the accidental seepage of liquid downwardly between the inside of the container 10 and the can 11.

The front of the container 10 is provided at the top thereof with an integral spout 15, and the rear of the container is provided with an integral U-shaped handle 16 which has an upper horizontal arm 17. A flanged cover 18 is secured to the arm 17 by means of a pair of lugs 19 and a hinge pin 20. It will be seen that the cover 18 has the same diameter as the container 10, and abuts the upper edges of the container 10 so as to form a flush closure therefor.

The cover 18 is provided with means for cutting an opening in the can 11 in the form of an initially flat cutter strip 21, preferably of steel, which is secured to the underside of said cover in a position aligned with the spout 15 and the U-shaped handle 16, by means of a pair of screws 22.

The front end of the cutter strip 21 is bent downwardly to provide an inclined cutting blade 23 having a pair of sharp cutting edges 24 which converge to a pointed end 25.

It will be understood that the pointed end 25 of the cutting blade 23 is so disposed that when the cover 18 is swung downwardly toward closed position, said end 25 will pierce the top of the can 11 at a point closely adjacent the side wall of said can. Continued downward movement of the cutting blade 23 will form a pouring opening 26 in the can 11, the material which is cut from said opening being bent inwardly and rearwardly to form a curled section 27 (as shown in Fig. 3).

The rear end of the cutter strip 21 is bent downwardly to form a vertical pointed blade 28 which is adapted to form a vent opening 29 by deflecting a section 30 of the can material inwardly and rearwardly.

In order to facilitate the flow of liquid from the can 11 through the forward pouring opening 26, the inclined cutting blade 23 is provided with an elongated opening 31, which extends above the top of the can 11, thereby affording free access of air to the vent opening 29 from the atmosphere.

A slot 32 is provided in the cover 18 above the cutting blade 23, whereby liquid may be readily poured from the spout 15 through the opening 26. The cover 18 is preferably provided with a circular packing disk 33 of rubber or other suitable resilient material, which disk has a rearwardly-extending slot 34 coincident with the slot 32 in order to embrace the strip 21 and the cutting blades 23 and 28. The slot 34 also serves as a passage for air to the vent opening 29.

The packing disk 33 will aid in holding the can 11 firmly in place, and also will guide the liquid in flowing from the can 11 and prevent it from accidentally spreading over the top of said can under the cover 18.

In order to detachably lock the cover 18 positively in closed position, provision is preferably made of a U-shaped bail 35 which is pivoted in a pair of bosses 36 formed on opposite sides of the exterior of the container 10. The bail 35 is adapted to be swung over an elongated block 37 which is secured to the top of the cover 18 by means of the screws 22. The block 37 is provided with a central top groove 38 which is adapted to receive and releasably hold the bail 35. The groove 38 also has an inclined forward surface 39 for guiding said bail into said groove.

Operation

In operation, a can 11 of milk or any other desired fluent commodity will be inserted in the container 10, and the cover 18 swung downwardly to closed position, thereby causing the cutting blade 24 and the venting blade 28 to form the pouring opening 26 and the vent opening 29 in the top of the can 11.

The bail 35 will then be swung upwardly and sprung over the inclined surface 39 into the groove 38 so as to hold the cover 18 firmly in closed position. The liquid may then be poured from the can 11 merely by tipping the container 10, whereupon the liquid will pass freely around the sides of the cutting blade 23 and through the opening 31, and then outwardly through the spout 15. This operation will be facilitated by the free access of air to the vent opening 29 through the cover slots 32 and 34, and the upper end of the blade slot 31.

One advantage of the device herein disclosed is that it will completely conceal the can, the appearance of the container being sufficiently attractive so that it may be used at the dining table and it will be unnecessary to transfer the contents of the can to another receptacle.

Another advantage is that the operation of opening the can will be accomplished simultaneously with the operation of securing a can in the container, thereby saving time and effort.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a combined can opener and pitcher, a container adapted to receive a sealed can, a cover for said container swingably connected to the outer edge thereof, a duplex, single piece, integral, cutter member formed from flat sheet material fixed against the underside of said cover and adapted to pierce pouring and vent openings in the can when said cover is closed downwardly against said container, said duplex cutter member comprising a forward obliquely-depending V-shaped cutting knife portion adapted to pierce a V-shaped pouring opening in the top of the can at a point contiguous to its edge and a rearward vertically-depending vent-cutting element portion adapted to pierce a vent opening in the top of the can at a position rearward of said pouring opening, said cover having an open-ended pouring slot adjacent said V-shaped cutting knife portion.

2. The invention as defined in claim 1, including a circular packing ring seated in an annular groove within the upper internal edge of said container for closely embracing the upper edge of the can.

3. The invention as defined in claim 2, including a packing disk having a slot disposed against the underside of said cover, said packing disk slot being in alignment with and embracing said duplex cutting member, said V-shaped cutting knife portion being provided with a central longitudinal recess whereby air may easily flow through said cover pouring slot, said longitudinal recess, and said packing disk slot and enter the vent opening in the can formed by said vent cutting element portion.

FRANK S. MANNER.

REFERENCES CITED

The following references are of record in the file of this patent:

UNITED STATES PATENTS

| Number | Name | Date |
|---|---|---|
| 1,307,908 | Laverman | June 24, 1919 |
| 1,658,165 | Hopkins | Feb. 7, 1928 |
| 1,710,239 | Paulson | Apr. 23, 1929 |
| 1,920,385 | Hamilton | Aug. 1, 1933 |
| 1,948,997 | Vaverck et al. | Feb. 27, 1934 |
| 2,053,370 | Kann | Sept. 8, 1936 |
| 2,058,905 | Moran et al. | Oct. 27, 1936 |
| 2,110,697 | Buschman | Mar. 8, 1938 |
| 2,246,419 | Luce | June 17, 1941 |